Nov. 19, 1940.   S. O. WHITE ET AL   2,221,900
SYNCHRONIZING TRANSMISSION
Filed Jan. 14, 1939
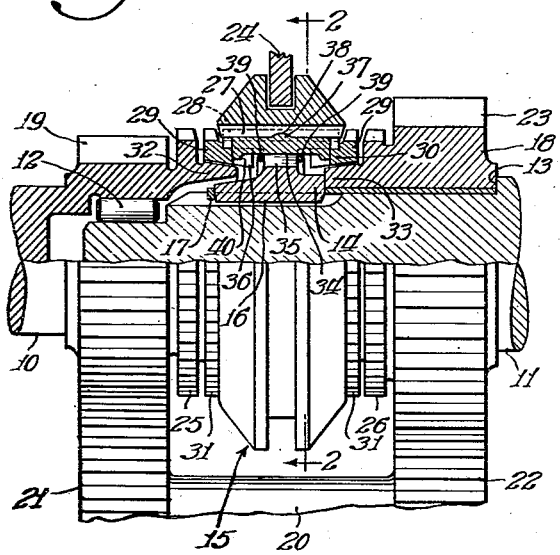
Fig. 1
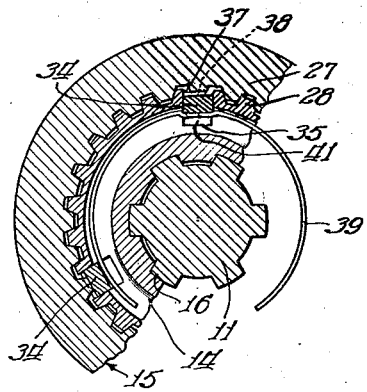
Fig. 2
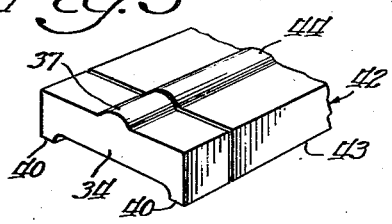
Fig. 3
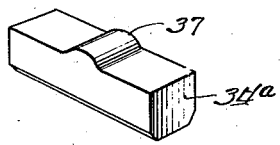
Fig. 4
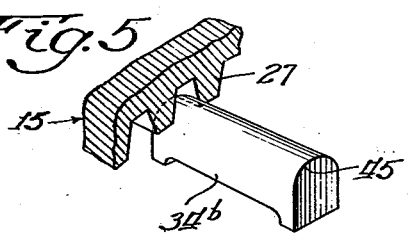
Fig. 5
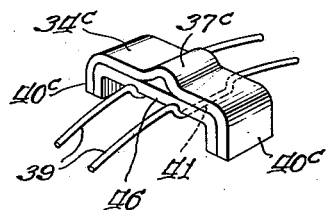
Fig. 6
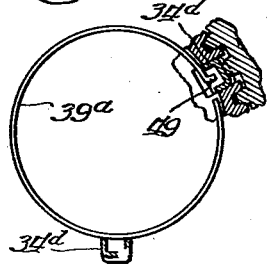
Fig. 7
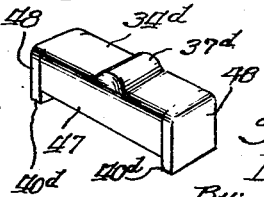
Fig. 8
Fig. 9
Inventors:
Samuel O. White and
Bruce A. Barr
By: Edward C. Gritzbaugh
Atty.

Patented Nov. 19, 1940

2,221,900

UNITED STATES PATENT OFFICE 2,221,900

SYNCHRONIZING TRANSMISSION

Samuel O. White and Bruce A. Barr, Muncie, Ind., assignors to Borg-Warner Corporation, Chicago, Ill., a corporation of Illinois Application January 14, 1939, Serial No. 250,908

22 Claims. (Cl. 192—53)

This invention relates to synchronizing change-speed gear transmissions of the type employed, for example, in motor vehicles wherein there is provided means for effecting synchronization of a pair or pairs of torque-transmitting members preparatory to connecting said members in positive drive engagement with each other through the medium of a movable jaw clutch element, drivingly associated with one of said members and adapted to be shifted axially into clutching engagement with a complementary jaw clutch element on the other of said members. The invention is particularly directed to synchronizing transmissions of the type wherein the synchronizing means comprises friction clutch elements drivingly associated with the respective torque-transmitting members, one of said elements being adapted to be moved axially into engagement with the other in the initial stage of shifting of the movable jaw clutch element, through the medium of a thrust bar or a plurality of thrust bars having axial thrust-transmitting engagement with the movable jaw clutch element and the movable friction clutch element respectively.

The invention has as its primary object, to simplify and reduce the expense of manufacture of a synchronizing transmission of the type outlined above. It has this object particularly in connection with the provision of resilient means for urging the thrust bars radially outwardly into thrust-transmitting engagement with the interior of the movable jaw clutch sleeve. In prior structures of this general type, it has been proposed to provide for this purpose, springs or other resilient devices, each having one region engaged against a thrust bar and an opposite region engaged against the hub on which the jaw clutch sleeve is mounted. For proper retention of the resilient means in an arrangement of this kind, it was considered preferably to provide a recess in the hub to receive the resilient means.

Such an arrangement involved somewhat difficult problems of assembly. The present invention solves those problems by providing an arrangement wherein the resilient means is of such a character that it need not be mounted in a recess in, or even in direct contact with, the hub. Furthermore, it provides for a reduction in the number of individual springs required in a synchronizer wherein there are three or more of the thrust bars.

Another object of the invention is to achieve the foregoing advantages in a synchronizer which is positive and dependable in operation. In this aspect, the invention contemplates an extremely simple form of break-away thrust-transmitting connection between the thrust bars and the slidable jaw clutch sleeve, which may be simply an integral projection on a thrust bar, engaging in a corresponding recess in the sleeve, and maintained in effective engagement by the resilient means referred to above, acting individually against both end regions of the thrust bar.

Another object of the invention is to provide a relatively inexpensive method of manufacture of a thrust bar in the form of a solid bar having the integral projection mentioned above.

Another object of the invention is to provide a synchronizer of the type outlined above, wherein the thrust bars may serve to retain the resilient means against escaping axially beyond the ends of the thrust bars, and the resilient means may function to prevent the bars from escaping from assembly, while partially completed units of the invention are being handled in the shop.

Other objects, the advantages and uses of the invention will become apparent after reading the following specification and claims, and after consideration of the drawing forming a part of the specification, wherein:

Fig. 1 is an axial sectional view through a transmission synchronizer embodying the invention;

Fig. 2 is a transverse sectional view thereof, taken as indicated by the line 2—2 of Fig. 1;

Fig. 3 is a perspective view of a section of thrust bar stock, illustrating the method of forming the thrust bar;

Fig. 4 is a perspective view of a modified form of the thrust bar;

Fig. 5 is a perspective view of another modification of the thrust bar;

Fig. 6 is a perspective view of another modification of the thrust bar;

Fig. 7 shows a modified form of the spreader spring, in connection with a modification of the thrust bar;

Fig. 8 is a side elevation of the thrust bar shown in Fig. 7; and

Fig. 9 is an axial sectional view illustrating a further modification of the spreader ring.

As an illustration of one form in which the invention may be embodied, we have shown in Fig. 1, a synchronizing transmission including a pair of aligned torque-transmitting members 10 and 11, the forward end of the member 11 being piloted, as at 12, in the rear end of the member 10. The member 10 may be the driving shaft of a conventional automobile transmission, and the member 11 the driven shaft of such a transmission. A hub 14 is secured to the shaft 11 as by means of a splined connection 16, and is located against axial movement by a retaining ring 17, on one side, and a reduction geared torque-transmitting member 18 on the other side, the latter being mounted against a shoulder 13 formed on the shaft 11.

The reduction geared member 18 is driven from the drive shaft 19 through constant mesh gearing including a gear 19 formed on the drive shaft 10, a countershaft 20 having a gear 21 meshing with the gear 19, and having a second gear 22, and a gear 23 formed on the torque-transmitting member 18 and meshing with the gear 22.

A positive drive connection is adapted to be established between the torque-transmitting members 10 and 11, or between the reduction geared torque-transmitting member 18 and the member 11 by an axially movable jaw clutch element 15 formed with internal clutch teeth 27, in sliding splined engagement with teeth 28 forming the periphery of the hub member 14, and adapted to be shifted axially by a shifting fork 24 to bring the teeth 27 into positive clutching engagement with clutch teeth 25 formed on the torque-transmitting member 10, or clutch teeth 26 formed on the torque-transmitting member 18.

Upon being moved into clutching engagement with the teeth 25, the movable clutch element 15 will receive rotation from the drive shaft 10 and transmit it directly through the hub 14 to the driven shaft 11. Upon being moved in the opposite direction into clutching engagement with the teeth 26, the movable clutch element 15 will receive rotation from the torque-transmitting member 18 through the countershaft 20, and will transmit such rotation through the hub member 14 to the driven shaft 11.

In order to synchronize a torque-transmitting member 10 or 18 with the movable jaw clutch element 15, preparatory to establishing such positive clutching engagement, we provide a pair of synchronizer rings 29, each including a substantially cylindrical collar portion 30 rotatably mounted within the rim portion of the hub 14, and a peripheral portion which is provided with blocker teeth 31 between which the teeth 27 of the movable jaw clutch element must pass before the clutching engagement with the teeth 25 or 26 may be established. The opposed ends of the teeth 27 and 31 may be chamfered, in accordance with well known practice. The synchronizer rings 29 are provided with internal conical friction clutch faces adapted to engage complementary external conical friction clutch faces of friction clutch elements 32 and 33 respectively, formed on the torque-transmitting members 10 and 18.

The mounting of the synchronizer rings 29 within the rim of the hub 14 is such as to allow them to move both circumferentially and axially with respect to the hub. The axial movement enables them to establish engagement with their respective cooperating friction clutch elements 32 and 33. Such axial movement is transmitted to a synchronizer ring from the movable jaw clutch element 15 during the initial stage of shifting movement thereof, through the medium of a thrust bar or a plurality of thrust bars 34, which are interposed between the movable jaw clutch sleeve 15 and the hub 14, and received in notches 35 in the periphery of the hub 14. The thrust bars 34 are confined against circumferential movement by the notches 35, but are free to slide longitudinally therein in paths parallel to the axis of the torque-transmitting members 10 and 11.

The ends of the thrust bars 34 are received in notches 36 in the synchronizer rings 29, and are abutted against the rings 29 so as to transmit axial thrust thereto.

The notches 36 are wider than the ends of the bars 34 so as to allow a limited amount of circumferential shifting movement of the synchronizer rings relative to the hub, whereby a synchronized ring may shift from a position in which the blocker teeth 31 are effective to block axial shifting movement of the movable jaw clutch sleeve 15, to a position in which the movable jaw clutch sleeve 15 may pass on into clutching engagement with a jaw clutch element 25 or 26. By thus utilizing the projecting ends of the thrust bars for engagement in notches in the synchronizer rings, we eliminate the necessity of employing separate connecting means for establishing a lost motion connection between the synchronizer rings 29 and the hub 14. However, it is to be understood that other forms of lost motion connection, well known in the art, may be employed.

In the preferred form of the invention, the transmission of axial thrust from the movable jaw clutch element 15 to the thrust bars 34 is provided for in the form of a break-away connection comprising a projection 37 formed integrally in the central region of a thrust bar, and a corresponding recess 38 in a tooth or teeth 27 of the movable jaw clutch sleeve 15, in which recess 38 the projection 37 is engageable.

The thrust bars 34 are yieldingly urged radially outwardly by a pair of resilient expander rings 39, which may be either in the form of a complete annulus, as shown at 39a in Fig. 7, or may, as in the preferred form of the invention, have their ends spaced a substantial distance apart. The rings 39 are received between the web portion of the hub 14, and the opposed extremities of the collar portions 30 of the synchronizer rings 29. They are formed with a normal diameter greater than the diameter of the inner sides of the assembled thrust bars 34, so that when assembled, they are biased under compression so as to urge the bars radially outwardly into engagement with the interior of the movable jaw clutch sleeve 15.

In the preferred form of the invention, the ends of the thrust bars 34 are provided with radially inwardly projecting lips 40 which retain the rings 39 against escape from engagement with the bars 34 during the assembling of the latter within the movable jaw clutch sleeve 15.

Intermediate their ends, the rings 39, in the preferred form of the invention, are provided with depressed regions 41 which receive one of the bars 34. Being constantly urged under the expanding force of the springs 39, into engagement with the bar 34, the depressions 41 serve to locate the ring 39 against circumferential movement. The other two bars 34 are engaged by the respective end regions of the rings 39, and since there is no possibility of the rings slipping circumferentially, there is no danger of them allowing any of the bars 34 to escape.

The space between the ends of the ring makes it easier to contract the ring during the assembly operation. After having first threaded the sleeve 15 upon the hub 14, the thrust bars 34 may be slipped longitudinally into the apertures defined between the recesses 35 and the sleeve 15, and each ring 39 may then be inserted by first placing the depressed portion 41 into engagement with one of the thrust bars behind a lip 40 thereof, and then successively springing the two end regions into place behind the lips 40 of their respective thrust bars. As each region of a ring is thus sprung into place, it will be retained by its respective lip 40 against springing out again while the operator is working upon another portion of the spring. In addition to thus facilitating assembly, the lip construction 40 securely retains the thrust bars against dropping out of the assembled unit while the latter is being handled during further assembling operation, prior to the final complete assembly in a transmission. The thrust bars and the spring rings 39 mutually retain each other against dislodgement from assembly.

The invention contemplates a simple and inexpensive method of constructing a thrust bar of the type described. According to this method, a strip of stock 42 is die-drawn or rolled with flanges 43 on one side, and a central bead 44 on the other side, so that in cross section, the strip has the exact shape of a longitudinal side of the finished thrust bar 34. This strip of stock is then severed by transverse sawing into sections having the width of the thrust bars 34. These sections may be finished by machining the sawed faces, thereby producing the finished thrust bars, or may be utilized just as they are sawed from the strip.

Although the preferred mode of construction of the thrust bars is to include the retainer lips 40, it will be understood that the invention also contemplates the use of bars which are perfectly straight on their inner faces, as shown in Fig. 4 at 34a. The invention also contemplates, instead of the break-away connection 37—38, a purely frictional engagement between perfectly straight outer faces of the bars 34, and the interior of the sleeve 15 in accordance with the disclosure in the pending application of Samuel O. White, Serial No. 210,827, filed May 31, 1938, for Blocker synchronizer. Such a bar is shown in Fig. 5, at 34b, the outer surface, for engagement with the sleeve 15, being shown semi-cylindrical as at 45.

Instead of a solid bar cut out of stock, as in Fig. 3, the thrust bar may be formed of sheet metal, as shown in Fig. 6 at 34c. In this form of the invention, the central projection 37c and the end lips 40c are formed by bending a strip of metal in a forming die. The bar may be reenforced by a yoke-shaped truss 46 wedged between the lips 40c. The assembly and operation of the bar and the jaw clutch sleeve unit is the same as in the preferred form of the invention.

Another modification of the thrust bar wherein it is made of sheet metal, is shown in Fig. 8. The shape of the bar in this modification of the invention is very similar to that shown in Fig. 3. The bar, indicated generally at 34d, is formed with side walls 47 and end walls 48, the latter projecting beyond the side walls 47 to form lips 40d. This bar, like the bar 34c, has an extruded projection 37d.

This form of thrust bar, being relatively inexpensive, is preferred, and it is contemplated to employ this type of bar in connection with a spreader ring (such as that shown in Fig. 7) which is provided at one end with a radially outwardly extending finger 48 received in the hollow interior of the bar so as to locate the bar and ring with respect to each other.

This particular arrangement, in addition to solving the problems of mutual retention of the ring and bar by each other, is quite inexpensive, and is therefore preferred.

Instead of being turned radially outwardly, the finger 49 may be bent axially as shown in Fig. 9 at 49a, and received in a suitable depression 50 in the hub 14.

In the operation of the invention, assuming the movable jaw clutch sleeve 15 to be in a neutral position as shown in Fig. 1, and that the operator desires to shift the transmission into "intermediate," the shifting fork 24 is urged to the right, viewing Fig. 1, thereby urging the movable jaw clutch sleeve 15 toward the right, and with it the three thrust bars 34, which are maintained in yielding engagement with the sleeve 15, through the medium of the break-away connection 37—38 and the expander ring 39. The ends of the bars, engaging a synchronizer ring 29, will urge the latter into frictional clutching engagement with the friction clutch element 33 on the torque-transmitting member 18, thus causing the latter to approach the speed of rotation of the sleeve 15. The frictional engagement of the synchronizer ring 29 with the friction clutch element 34 will cause the ring 29 to become biased in position blocking further travel of the sleeve 15 until, upon the completion of synchronization, the synchronizer ring will move back to a central position, allowing the teeth 27 of the movable jaw clutch sleeve 15 to pass between the blocker teeth 31 and into positive clutching engagement with the teeth 26 of the torque-transmitting element 18.

The advantages of the invention include simplicity and relative cheapness of construction, reduction in the number of parts, ease of assembly, and sureness of operation.

We claim:

1. In a transmission synchronizer, a torque-transmitting member, a synchronizer element drivingly associated therewith and shiftable axially for establishing a frictional driving connection between said member and a rotatable part to be synchronized therewith, a jaw clutch sleeve encircling said member, drivingly connected thereto and shiftable axially for establishing a positive driving connection between said member and said part, a plurality of thrust elements interposed between said sleeve and said member and having axial thrust transmitting association with said sleeve and said synchronizer element respectively, and a pair of resilient expander rings engaging the radially inner sides of axially spaced regions of said thrust elements, so as to urge said thrust elements radially outwardly and yieldingly establish the thrust-transmitting association of said thrust elements and said sleeve.

2. In a transmission synchronizer, a torque-transmitting member, a synchronizer element drivingly associated therewith and shiftable axially for establishing a frictional driving connection between said member and a rotatable part to be synchronized therewith, a jaw clutch sleeve encircling said member, drivingly connected thereto and shiftable axially for establishing a positive driving connection between said member and said part, a plurality of thrust bars interposed between said sleeve and said member, and in axial thrust-transmitting association with said synchronizer element, means providing a break-away connection between each thrust bar and the interior of said sleeve for transmitting axial thrust from said sleeve to said bars, and resilient expander rings engaging axially separated regions of said bars so as to urge them outwardly and yieldingly maintain said break-away connection.

3. In a transmission synchronizer, a torque-transmitting member, a synchronizer element drivingly associated therewith and shiftable axially for establishing a frictional driving connection between said member and a rotatable part to be synchronized therewith, a jaw clutch sleeve encircling said member, drivingly connected thereto and shiftable axially for establishing a positive driving connection between said member and said part, a plurality of circumferentially spaced thrust bars interposed between said sleeve and said member, extending parallel to the axis of rotation, their ends abutting said synchronizer element for the transmission of axial thrust thereto, means forming a break-away connection between each bar and the interior of said sleeve, and resilient expander rings engaging axially separated regions of said bars and urging them radially outwardly, whereby to yieldingly maintain said break-away connection.

4. In a transmission synchronizer, a torque-transmitting member, a synchronizer element drivingly associated therewith and shiftable axially for establishing a frictional driving connection between said member and a rotatable part to be synchronized therewith, a jaw clutch sleeve encircling said member, drivingly connected thereto and shiftable axially for establishing a positive driving connection between said member and said part, a plurality of circumferentially spaced thrust bars interposed between said sleeve and said member, extending parallel to the axis of rotation, their end regions in thrust-transmitting relation to said synchronizer element and forming therewith a lost motion connection allowing limited circumferential movement of said synchronizer element relative to said member, means providing a break-away connection between each thrust bar and the interior of said sleeve for transmitting axial thrust from said sleeve to said bars, resilient expander rings engaging axially spaced regions of said bars, whereby to yieldingly maintain said break-away connection, and blocking means carried by said synchronizer element and adapted, when the latter is at one limit of its lost motion connection, to block the path of axial advance of said sleeve.

5. In a transmission synchronizer, coaxial driving and driven rotatable members, a hub mounted on said driven member and having peripheral teeth, an annular movable jaw clutch element having internal teeth meshing with said peripheral teeth and axially slidable relative thereto into clutching engagement with jaw clutch teeth formed on said driving member, thus to establish a positive drive connection between said members, a synchronizer ring carried by and axially movable with respect to said hub into frictional driving engagement with said driving member, a plurality of circumferentially spaced thrust bars interposed between said movable jaw clutch element and said hub, extending parallel to the axis of said members, arranged to yieldingly receive axial thrust from said movable jaw clutch element, and to transmit such axial thrust to said synchronizer ring, and a pair of resilient expander rings engaging the inner sides of the respective end regions of said bars so as to urge said bars radially outwardly and establish the yielding thrust transmitting engagement between said bars and said jaw clutch element.

6. In a transmission synchronizer, a pair of axially spaced rotatable driving members, a driven member, a hub mounted on said driven member, between said driving members, a movable jaw clutch sleeve encircling said hub and mounted thereon for axial sliding movement into clutching engagement with jaw clutch teeth formed on said driving members, synchronizer rings mounted in the axially opposite sides of said hub for axial movement into frictional driving engagement with said driving members, a plurality of thrust bars interposed between said sleeve and hub, extending parallel to the axis of said members, and arranged to yieldingly receive axial thrust from said movable clutch element and to transmit said thrust to said synchronizer rings, and a pair of resilient expander rings axially positioned between axially opposed regions of said hub and synchronizer rings, and yieldingly engaging said bars so as to urge them outwardly to establish said yielding thrust-transmitting engagement between said bars and said sleeve.

7. In a transmission synchronizer, a torque-transmitting member, a synchronizer element drivingly associated therewith and shiftable axially for establishing a frictional driving connection between said member and a rotatable part to be synchronized therewith, a jaw clutch sleeve encircling said member, drivingly connected thereto and shiftable axially for establishing a positive driving connection between said member and said part, a plurality of thrust bars interposed between said sleeve and member, extending parallel to the axis of rotation, having integral projections engageable in recesses in the interior of said sleeve for receiving axial thrust therefrom, and having their ends in thrust-transmitting engagement with said synchronizer ring, and resilient expander rings engaging the respective end regions of said bars so as to urge them radially outwardly.

8. In a transmission synchronizer, a torque-transmitting member, a synchronizer element drivingly associated therewith and shiftable axially for establishing a frictional driving connection between said member and a rotatable part to be synchronized therewith, a jaw clutch sleeve encircling said member, drivingly connected thereto and shiftable axially for establishing a positive driving connection between said member and said part, a thrust-transmitting bar interposed between said sleeve and said member, extending parallel to the axis of rotation in thrust-transmitting association with said synchronizer element, and having an integral projection engageable in a recess in the interior of said sleeve for receiving axial thrust therefrom, and separate yielding means engaging the respective end regions of said bar and urging the same radially outwardly for maintaining said break-away connection.

9. In a transmission synchronizer, a torque-transmitting member, a synchronizer element drivingly associated therewith and shiftable axially for establishing a frictional driving connection between said member and a rotatable part to be synchronized therewith, a jaw clutch sleeve encircling said member, drivingly connected thereto and shiftable axially for establishing a positive driving connection between said member and said part, a thrust bar interposed between said sleeve and said member, extending parallel to the axis of rotation, having an axial thrust-receiving connection with the interior of said sleeve and having an end region in axial thrust-transmitting engagement with said synchronizer element, and resilient expander rings engaging the respective end regions of said bar and urging the same radially outwardly so as to maintain said yielding thrust receiving connection.

10. In a transmission synchronizer, a torque-transmitting member, a synchronizer element drivingly associated therewith and shiftable axially for establishing a frictional driving connection between said member and a rotatable part to be synchronized therewith, a jaw clutch sleeve encircling said member, drivingly connected thereto and shiftable axially for establishing a positive driving connection between said member and said part, a thrust bar interposed between said sleeve and said member and axially slidable in a peripheral depression in said member, having its end in thrust transmitting association with said synchronizer element, and having in one side an integral projection adapted to be received in a depression in the interior of said sleeve so as to receive axial thrust therefrom, and separate resilient means engaging the respective end regions of said bar and urging the same radially outwardly.

11. In a transmission synchronizer, a torque-transmitting member, a synchronizer element drivingly associated therewith and shiftable axially for establishing a frictional driving connection between said member and a rotatable part to be synchronized therewith, a jaw clutch sleeve encircling said member, drivingly connected thereto and shiftable axially for establishing a positive driving connection between said member and said part, a thrust bar interposed between said sleeve and said member, said thrust bar having at its end a radially inwardly extending lip engageable against said synchronizer element for transmitting axial thrust thereto, and being formed intermediate its ends with a projection adapted to engage a depression in the interior of said sleeve for receiving thrust therefrom, and separate resilient means acting against the respective end regions of said bar and urging the same radially outwardly into engagement with the interior of said sleeve.

12. In a transmission synchronizer, a torque transmitting member, a synchronizer element drivingly associated therewith and adapted under axial pressure to establish a frictional synchronizing connection between said member and a rotatable part to be synchronized therewith, an annular positive drive element encircling said member, drivingly connected thereto and shiftable axially for establishing a positive driving connection between said member and said part, a thrust bar interposed between said positive drive element and said member, extending parallel to the axis of rotation, arranged to yieldingly receive axial thrust from said positive drive element and transmit such thrust to said synchronizer element, and a pair of resilient expander rings engaging axially spaced regions of said bar and urging the same radially outwardly so as to maintain the yielding thrust receiving association with said positive drive element.

13. A transmission synchronizer as defined in claim 12, wherein said bar is provided at its ends with radially inwardly projecting lips adapted to coact with said rings to restrain the latter against escape from operative engagement with said bar.

14. A transmission synchronizer as defined in claim 12, wherein said bar comprises a pair of nested stamped sheet metal yokes having radially inwardly projecting end regions adapted to coact with said expander rings so as to restrain them against escape from operative association with said bar, and the outer yoke being provided with an integral extruded projection adapted to coact with a recess in the interior of said positive drive element for establishing said yieldable thrust receiving association.

15. A transmission synchronizer as defined in claim 12, wherein said thrust bar is of stamped sheet metal including a web portion formed with an integral extruded projection adapted to co-operate with a recess in the interior of said positive drive element so as to establish the yieldable thrust receiving association therewith, and side and end flanges projecting radially inwardly.

16. A synchronizing transmission as defined in claim 12, wherein said bar is of stamped sheet metal comprising a web portion formed with an integral extruded projection adapted to cooperate with a recess in the interior of said positive drive element for establishing the yielding thrust receiving connection therewith, and radially inwardly projecting side and end flanges, said end flanges projecting beyond the side flanges to form lips adapted to cooperate with said expander rings so as to restrain the latter against escape from operative engagement with the bar.

17. In a transmission synchronizer, a torque transmitting member, a synchronizer element drivingly associated therewith and shiftable axially for establishing a frictional synchronizing connection between said member and a rotatable part to be synchronized therewith, an annular positive drive element encircling said member, drivingly connected thereto and shiftable axially for establishing a positive driving connection between said member and said part, a plurality of circumferentially spaced thrust bars interposed between said positive drive element and said member, extending parallel to the axis of said member, arranged to yieldingly receive thrust from said positive drive element and to transmit such thrust to said synchronizer element, said bars having end regions formed with radially inwardly projecting lips, and a resilient expander ring engaging the radially inner sides of said bars between said lips and said member so as to urge said bars radially outwardly for establishing the yieldable thrust receiving engagement with the positive drive element, said lips cooperating with said ring to restrain the latter against escape from operative engagement with the bars.

18. In a transmission synchronizer, a torque transmitting member, a synchronizer element drivingly associated therewith and shiftable axially for establishing a frictional synchronizing connection between said member and a rotatable part to be synchronized therewith, an annular positive drive element encircling said member, drivingly connected thereto and shiftable axially for establishing a positive drive connection between said member and said part, a plurality of thrust bars interposed between said sleeve and said member, in axial thrust transmitting association with said synchronizer element, means providing a breakaway connection between each thrust bar and said positive drive element for transmitting axial thrust from said positive drive element to said bars, and a resilient expander ring engaging said bars so as to urge them outwardly and yieldingly maintain said breakaway connections.

19. In a transmission synchronizer, a torque transmitting member, a synchronizer element drivingly associated therewith and shiftable axially for establishing a frictional synchronizing connection between said member and a rotatable part to be synchronized therewith, an annular positive drive element encircling said member, drivingly connected thereto and shiftable axially for establishing a positive driving connection between said member and said part, a plurality of thrust bars interposed between said positive drive element and said member, extending parallel to the axis of rotation, in axial thrust transmitting association with said synchronizer element, and each having an integral projection adapted to cooperate with said positive drive element for yieldingly receiving thrust therefrom, and a resilient expander ring engaging said bars and urging them radially outwardly so as to establish the thrust receiving association of said projections with said sleeve.

20. In a transmission synchronizer, a torque transmitting member, a synchronizer element drivingly associated therewith and shiftable axially for establishing a frictional synchronizing connection between said member and a rotatable part to be synchronized therewith, a positive drive element encircling said member, drivingly connected thereto and shiftable axially for establishing a positive drive connection between said member and said part, a thrust transmitting bar interposed between said positive drive element and said member, extending parallel to the axis of rotation, in thrust transmitting association with said synchronizer element, and having means providing yieldable breakaway thrust receiving association with said positive drive element, and separate yieldable means engaging the respective end regions of said bar and urging the same radially outwardly for maintaining said breakaway thrust receiving association.

21. In a transmission synchronizer, a torque transmitting member, a synchronizer element drivingly associated therewith and shiftable axially for establishing a frictional synchronizing connection between said member and a rotatable part to be synchronized therewith, an annular positive drive element encircling said member, drivingly connected thereto and shiftable axially for establishing a positive driving connection between said member and said part, a plurality of thrust bars interposed between said positive drive element and said member, arranged to yieldingly receive axial thrust from said positive drive element and to transmit such thrust to said synchronizer element, and a resilient expander ring engaging the radially inner sides of said thrust bars and urging said bars radially outwardly to yieldingly establish said thrust receiving association with said positive drive element, said ring being open and having a radially inwardly depressed region engaging one of said bars to hold said ring against circumferential displacement.

22. In a transmission synchronizer, a torque transmitting member, a synchronizer element drivingly associated therewith and shiftable axially for establishing a frictional synchronizing connection between said member and a rotatable part to be synchronized therewith, an annular positive drive element encircling said member, drivingly connected thereto and shiftable axially for establishing a positive driving connection between said member and said part, a plurality of thrust bars interposed between said positive drive element and said member, arranged to yieldingly receive axial thrust from said positive drive element and to transmit such thrust to said synchronizer element, and a resilient expander ring engaging the radially inner sides of said thrust bars and urging said bars radially outwardly to yieldingly establish said thrust receiving association with said positive drive element, said ring being open and having at one end a radially outwardly projecting finger received in a recess in one of said bars for retaining said ring against circumferential displacement.

SAMUEL O. WHITE.
BRUCE A. BARR.